United States Patent [19]
Wright

[11] 4,142,774
[45] Mar. 6, 1979

[54] FLEXIBLE OPTICAL TRANSDUCER

[75] Inventor: Stephen Wright, London, England

[73] Assignee: International Standard Electric Corporation, New York, N.Y.

[21] Appl. No.: 805,270

[22] Filed: Jun. 10, 1977

[30] Foreign Application Priority Data

Jun. 15, 1976 [GB] United Kingdom ............... 24685/76

[51] Int. Cl.² ........................... G02B 5/14; G02F 1/29
[52] U.S. Cl. ............................... 350/96.12; 350/96.19; 350/359
[58] Field of Search ............... 350/96.12, 96.13, 96.15, 350/96.19, 162 R, 358, 359, 360, 363

[56] References Cited

U.S. PATENT DOCUMENTS

| | | | |
|---|---|---|---|
| 3,340,416 | 9/1967 | Young | 350/162 R |
| 3,906,393 | 9/1975 | Fletcher et al. | 350/96.19 |
| 3,942,048 | 3/1976 | Laude et al. | 350/162 R |
| 4,039,249 | 8/1977 | Kaminow | 350/96.19 |

*Primary Examiner*—John K. Corbin
*Assistant Examiner*—R. Hille
*Attorney, Agent, or Firm*—John T. O'Halloran; Stephen Goldman

[57] ABSTRACT

An optical transducer is provided that has a flexible transducer member having a set of grooves in one of its major surfaces. Flexure of the transducer member produces a strain pattern that extends across an optical waveguide in the member. This strain pattern has a pitch that will diffract light of a suitable wavelength propagating in the optical waveguide.

9 Claims, 3 Drawing Figures

FLEXIBLE OPTICAL TRANSDUCER

This invention relates to transducers.

According to the present invention there is provided a transducer including a flexible transducer member having a set of grooves in one major surface thereof which are such that flexure of the member produces a periodic strain pattern in the member, which strain pattern extends across an optical waveguide which forms part of the member and has a pitch that will diffract light of a suitable wavelength propagating in said waveguide.

The term light is used here and elsewhere in this specification not in the narrow sense of pertaining exclusively to the visible region of the electromagnetic spectrum but in its broader sense that embraces also the infre-red and ultra-violet regions.

In one form of transducer, the transducer member is deflected by the receipt of acoustic energy, and the transducer may be designed to operate as a microphone producing optical modulation in response to the receipt of acoustic energy. Alternatively the transducer may be designed for operation as a strain sensor, or designed for operation as a pressure sensor.

Figure 1:
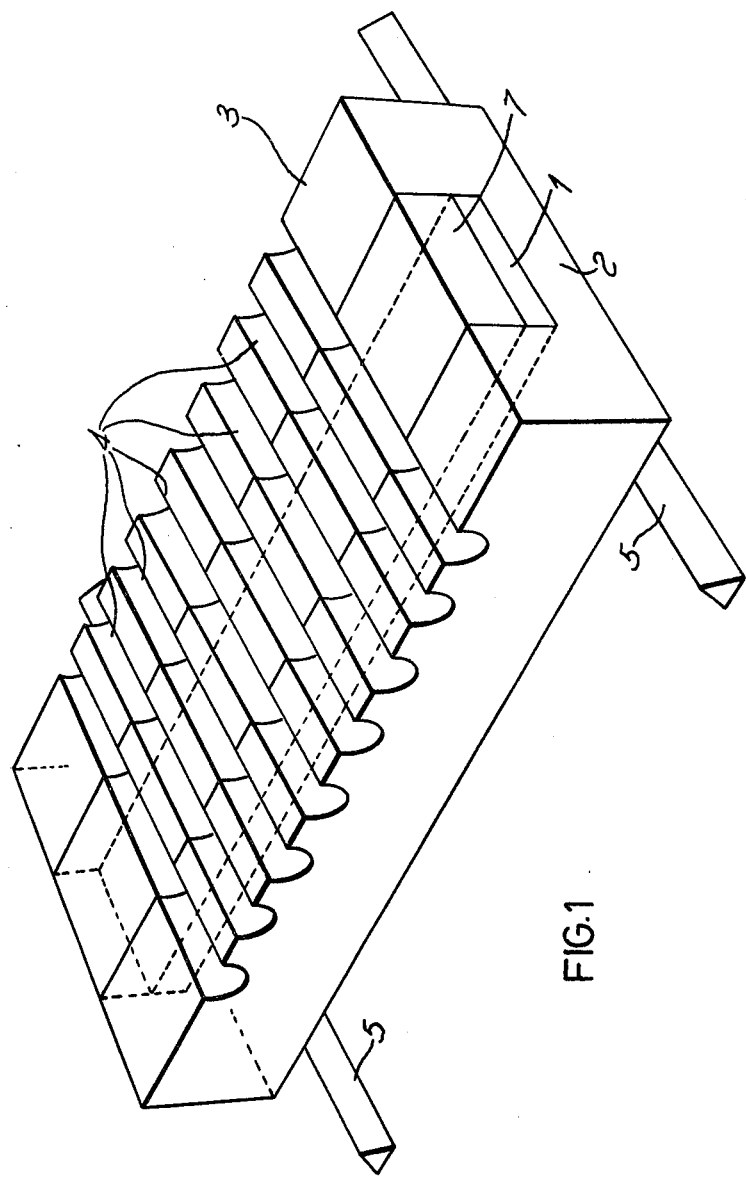
Figure 2:
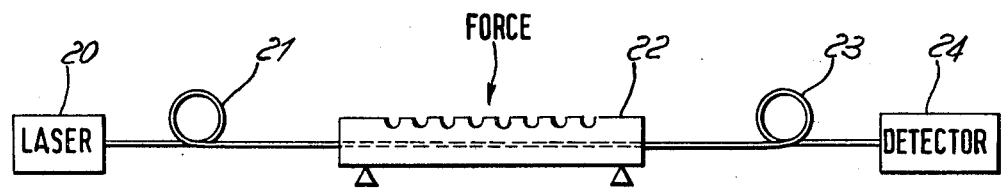
Figure 3:
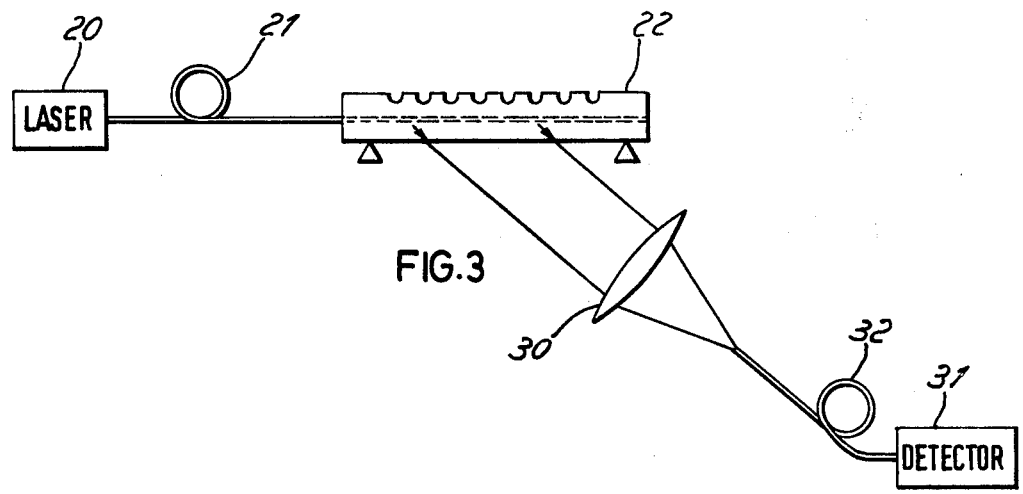

There follows a description of the transducer embodying the invention in a preferred form. The description refers to the accompanying drawings in which:

FIG. 1 depicts a schematic perspective view of the flexible transducer member, and FIGS. 2 and 3 depict alternative systems employing the transducer of FIG. 1.

The flexible transducer member of the accompanying drawings consists of a strip buried waveguide structure located immediately beneath a set of grooves extending transversely of the guide. The guide is formed by a flexible strip 1 of transparent material extending through a flexible substrate 2 of transparent material of lower refractive index than that of the strip 1. The top surface 3 of the substrate is provided with a set of regularly spaced transverse grooves 4 which extend to a depth just above the top of the strip 1. The substrate is mounted on supports 5 arranged so that the substrate will flex longitudinally when a load is applied to the top or bottom surface.

The substrate 2 may be made of glass, such as soda-lime glass, and the strip formed by ion exchange and diffusion. For this purpose the whole surface of the glass substrate is masked except for a strip on one major surface extending the length of the substrate, and of a width to give the required width of stripe 1. The masked substrate is then immersed in a bath of molten salt whose cations will exchange for cations in the glass thereby increasing its refractive index. In the case of a soda-lime glass, silver ions may be used for this purpose. The substrate is removed from the bath when the ion exchange has reached the required depth from the bottom of stripe 1. At this stage not only has the stripe been converted to higher refractive index material, but also the overlying portion 7. This overlying portion is reconverted to lower refractive index material by immersing the substrate in a second bath of a molten salt. In this instance the molten salt is one that will produce a lowering of the refractive index by providing cations that will readily exchange for the ones previously introduced by the first ion exchange process. In the case of a soda-lime glass substrate for which silver ions have been used to increase the refractive index, the silver ions in region 7 may be replaced with sodium ions to lower the refractive index again. The substrate is removed from the second bath when the ion exchange front has reached the level required for the top surface of the stripe 1. Next the substrate is remasked preparatory for etching the grooves 4 in the top surface 3. A wet etch may be used for this process or alternatively a plasma etching process. A preferred plasma etching process involves the use of a standard photolithographic techniques to produce an aluminium mask whose surface oxide layer protects the underlying aluminium from attack when the substrate is plasma etched in a reactive atmosphere. As a further alternative, RF sputter etching may be used. Aluminium may be used for masking, and the substrate is etched by energetic ions from a discharge in an argon-oxygen atmosphere.

When the completed transducer member is longitudinally flexed, the presence of the grooves in its upper surface produces, in the region underlying the grooves, a stress pattern that has a longitudinally periodic component. The construction of the transducer member is arranged so that this periodic component extends into the waveguide where it produces a longitudinal phase grating. The pitch of this grating is determined by the pitch of the grooves. This is chosen, in relation to the wavelength of a particular mode propagating in the waveguide, so that the phase grating diffracts the propagating light, acting as a mode converter in transferring power from that propagating mode either into other propagating modes or into radiating modes. If the pitch is chosen to be half the wavelength of a particular mode, the grating will reflect any power incident in that modes. Increasing the flexure of the transducer member will increase the stress which will increase the coupling coefficient, and so cause more power to be coupled out from the first mode.

At a specific depth beneath the top surface of the substrate the concentration of the stress in the regions immediately beneath the grooves depends upon the shape of the grooves and their depth. In the case of grooves of semi-circular cross section, the concentration factor can be as high as 3 immediately beneath the grooves but relaxes to unity at a depth equal to a small multiple of the groove depth.

FIG. 2 depicts one typical form of system employing the transducer in which light from a laser 20 is directed via an optical fibre 21 to the transducer 22, and from there, via a further fibre 23, to a detector 24. An alternative arrangement is depicted in FIG. 3 in which light diffracted out of the transducer is collected by a lens 30 and directed on to a photodetector 31 via an optical fibre 32. This latter arrangement has the property that the detector produces a null signal output when the transducer is unstrained, whereas the former arrangement produces a maximum signal under these conditions. With the arrangement of FIG. 3 it may facilitate the more efficient collection of the diffracted light to employ a transducer with a strip waveguide that is much wider than that of the fibre. In this instance a tapering waveguide section may be used to couple the fibre to the transducer. This tapering portion of waveguide may be formed integrally with the transducer itself.

One application for such transducers is in the provision of acousto-optical microphones. Another application is in the provision of pressure and/or strain sensors in fibre-optic telemetry systems.

I claim:

1. A flexible transducer comprising:
   a flexible substrate having a major surface, said substrate of transparent material having a first index of refraction;
   an optical waveguide of flexible material extending through said substrate, said waveguide having a higher index of refraction than said first index of refraction; and
   a set of grooves in said major surface, said grooves overlying and transverse to said waveguide, said grooves having a selected pitch such that flexure of said transducer produces a periodic strain pattern extending across said waveguide whereby light of a suitable wavelength propagating through said waveguide is diffracted therefrom.

2. The flexible transducer as set forth in claim 1, wherein said grooves extend in said substrate to a depth just above the top of said waveguide.

3. The flexible transducer as set forth in claim 1, wherein said grooves are longer than the width of said waveguide.

4. The flexible transducer as set forth in claim 3, wherein said grooves extend across the entire major surface of said substrate.

5. The flexible transducer as set forth in claim 1, wherein said grooves are semi-circular in cross-section.

6. A microphone incorporating a transducer as set forth in claim 1.

7. A strain sensor incorporating a transducer as set forth in claim 1.

8. A pressure sensor incoporating a transducer as set forth in claim 1.

9. A flexible optical transducer comprising:
   a flexible substrate having a major surface, said substrate of transparent material having a first index of refraction;
   an optical waveguide of flexible material extending through said substrate, said waveguide having a higher index of refraction than said first index of refraction; and
   a set of grooves in said major surface extending inward therefrom, said grooves overlying and transverse to said waveguide, said grooves having a selected pitch such that flexure of said substrate produces a periodic strain pattern extending across said waveguide, said periodic strain pattern thereby producing a longitudinal phase grating, whereby said grating diffracts light of a suitable wavelength propagating through said waveguide.

* * * * *